United States Patent [15] 3,694,007
Crow et al. [45] Sept. 26, 1972

[54] PIPE AND END ATTACHMENT
[72] Inventors: Harold E. Crow; Joseph Moffa; C. Frederick Berge, all of Middletown, Ohio
[73] Assignee: Armco Steel Corporation, Middletown, Ohio
[22] Filed: Nov. 23, 1970
[21] Appl. No.: 91,821

[52] U.S. Cl. .................. 285/5, 138/89, 285/368, 285/DIG. 2, 285/DIG. 4
[51] Int. Cl. ............................................. F16l 23/00
[58] Field of Search ........... 285/DIG. 4, 368, 5, 6, 337, 285/DIG. 12, 320, 412, 411, DIG. 2; 138/89

[56] References Cited

UNITED STATES PATENTS

| 3,453,010 | 7/1969 | Gevvetz et al. | 285/368 |
| 3,549,178 | 12/1970 | Flink | 285/368 X |
| 747,412 | 12/1903 | Getz | 285/320 X |
| 2,456,744 | 12/1948 | Sjoberg | 285/320 X |
| 3,594,893 | 7/1971 | Kuypers | 285/368 X |
| 769,131 | 8/1904 | Dillenburg | 285/368 X |
| 2,171,997 | 9/1939 | Jorgler | 285/337 |
| 3,029,095 | 4/1962 | King et al. | 285/411 |

Primary Examiner—Thomas F. Callaghan
Attorney—Melville, Strasser, Foster & Hoffman

[57] ABSTRACT

An adjustable joint coupling assembly for joining a pipe having an annular corrugation thereabout to an end attachment, such as a gate for controlling the flow of fluid through said pipe, a second pipe in end-to-end relationship, or a cap to stop any fluid flow therethrough, said assembly comprising a plurality of clamping members each having an arm pivotal about one end thereof in a plane substantially parallel to the axis of said pipe, and means for securing said arm to said pipe and restricting its movement to within said plane. The opposite end of said arm is provided with means for engagement with said end attachment to securely hold same against said pipe, whereby to provide a substantially leak resistant joint.

13 Claims, 8 Drawing Figures

PATENTED SEP 26 1972

INVENTORS
HAROLD E. CROW
JOSEPH MOFFA
C. FREDERICK BERGE

BY *Melville, Strasser, Foster and Hoffman*
ATTORNEYS

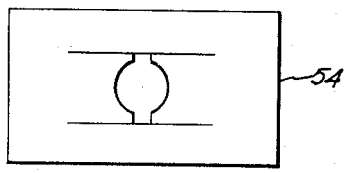
Fig. 5a
Fig. 5b
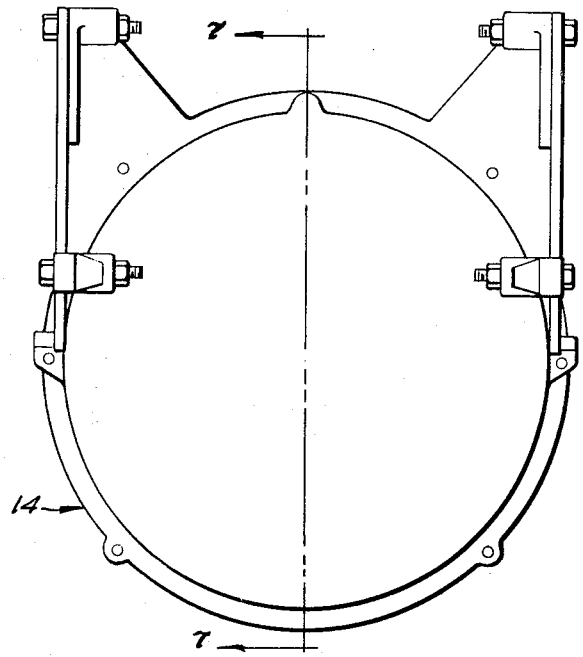
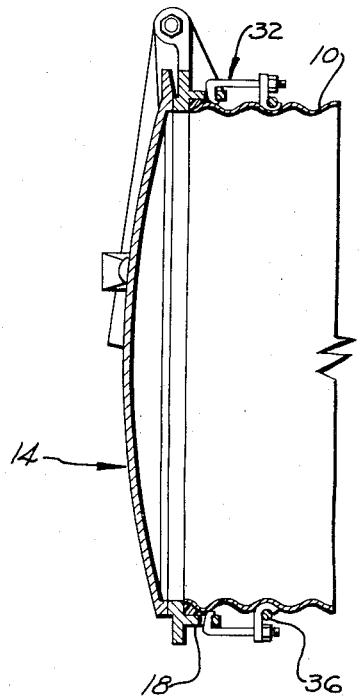
Fig. 6
Fig. 7

PIPE AND END ATTACHMENT

BACKGROUND OF THE INVENTION

This invention relates to a clamping member and to the assembly utilizing same whereby a pipe having an annular corrugation thereabout is joined in substantially leak resistant relationship to an end attachment. Said attachment may comprise a gate or valve, a second pipe in end-to-end relationship, a cap or the like, such that in all cases the fluid flowing through said pipe is controlled and that leakage therefrom is minimized.

While this invention has broad application, it has found particular utility in joining together corrugated steel pipe to a water control irrigation gate such as a spigot-end water gate. Thus, while the invention is particularly suitable for the latter application, it is not intended that the disclosure herein be so limited.

Irrigation systems, like many other fields of endeavor utilizing large and heavy equipment, require maintenance and installation to be effected in the field. This is particularly true of irrigation systems where heavy supporting equipment is not always available. For example, a leak resistant assembly is necessary and in fact critical to the proper operation of the system. This means that if leaking should occur, irrigation gates must be replaced or repaired where the installation is found.

One of the prior art methods for attaching a pipe to the gate seat is to drill or punch holes in the pipe wall and join same by means of bolts or rivets. However, this method generally requires the pipe to be attached to the gate at the plant, or else special equipment is necessary in the field to prepare each joint.

Contrary to the above, the present invention provides a system whereby the pipe can be attached to the end attachment, such as a gate, at the installation site with simple hand tools. Complete interchangeability is afforded between like sizes and select assembly is not required.

The present invention satisfies the requirement of ease of installation and maintenance by providing a mechanism for joining together the pipe and gate in a relatively easy but effective manner. It further provides for the utilization of a variety of pipes, such as annularly corrugated, helically corrugated, or smooth walled, the latter two having been provided with at least one annular corrugation on the end for use in securing the irrigation gate.

A further advantage of this invention is the fact that the connection between the pipe and the irrigation gate can be made directly to one another without the heretofore requirement of a short pipe or "can," fastened to the casting in the plant or in the field, intermediate the irrigation gate and pipe to be joined.

A further advantage to this system lies in the elimination of the equipment in the gate plant normally required for compressing sealant between the casting and the pipe. Heretofore such was necessary to insure a leak-resistant irrigation system.

These and other advantages will become apparent to those skilled in the art after reading these specifications.

BRIEF SUMMARY OF THE INVENTION

In the practice of this invention, a joint coupling assembly is provided for joining together a pipe having at least one annular corrugation at the end to be joined, to an end attachment. The latter may be an end closure, such as a gate, a valve, or an end cap. It also may be a partial closure such as a filter or debris guard. The system may be designed such as to substantially eliminate any leakage of fluid passing through the joint between said pipe and said end attachment.

This is accomplished by placing said end attachment in leak resistant relationship to said pipe and holding same in this position by means of an adjustable joint coupling assembly. Said coupling assembly comprises a plurality of clamping members composed of an arm pivotal in a plane parallel to the axis of said pipe, and which is provided with means for engaging the said end attachment. The end of said arm opposite the end attachment engaging end is held in pivotal relationship to said pipe by means of a rod or cable encircling said pipe and seated in said annular corrugation.

An effective seal between said pipe and said end attachment is accomplished by pre-setting said coupling assembly to engage said end attachment, and tightening said encircling rod or cable about said pipe. This action causes a portion of each said clamping member to move along the inclined surface of the underlying corrugation, and to exert a substantially uniform pressure on the resulting joint.

BRIEF DESCRIPTION OF THE DRAWINGS

FIGS. 5a and 5b are top and side views, respectively, of a SPEED NUT, known per se.

FIG. 6 is a top view of a typical, but not limiting, flap type gate suitable as an end attachment to be clamped to a pipe by the invention as described herein.

FIG. 7 is a sectional view taken along line 7—7 of the end attachment shown in FIG. 6.

DETAILED DESCRIPTION OF THE DRAWINGS

Figure 1:
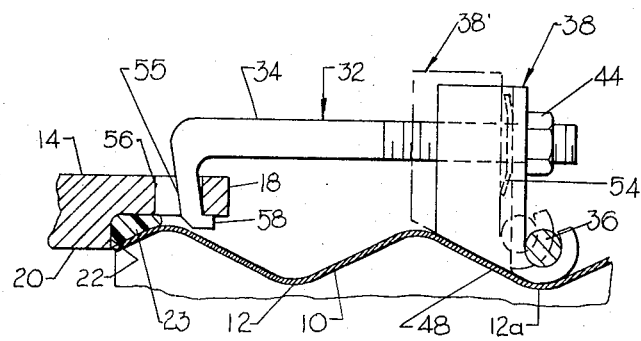
FIG. 1 is a partial sectional view, taken along a plane intersecting the axis of the pipe, illustrating a first embodiment of one clamping member in an operative position, the phantom lines indicating a pre-set condition for said clamping member.
Figure 2:
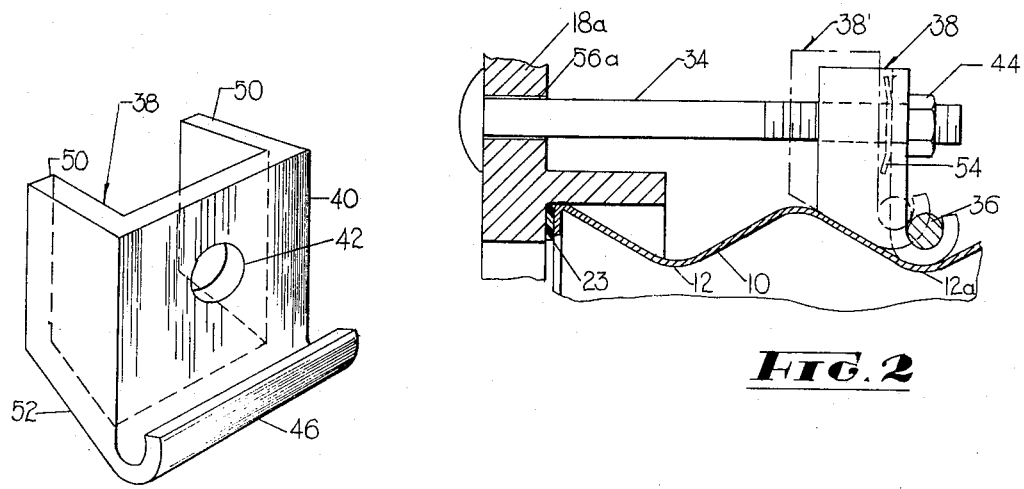
FIG. 2 is a partial sectional view similar to FIG. 1 but showing a second embodiment of a single clamping member.
Figure 4:
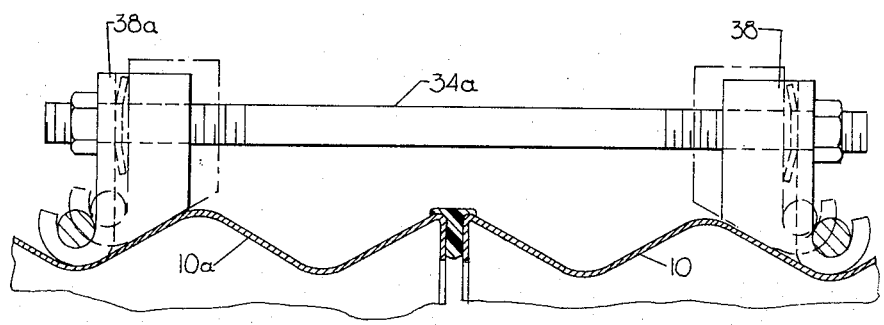
FIG. 4 is a partial sectional view through two pipes in end-to-end relation showing a variation on a single clamping member of this invention.

Turning now to the drawings in more detail, particularly FIGS. 1 and 2, the pipe 10 has been illustrated in section as having a series of annular corrugations 12, 12a . . . 12n throughout its length. However, it will be recalled from the previous discussion that the pipe may be helically corrugated, annularly corrugated or smooth walled, provided, however, there is at least one annular corrugation 12a near the end for use in securing the end attachment 14 against the pipe 10. Additionally, while the pipe 10 has been illustrated in FIG. 1 without a flanged or rolled end, such may be employed, as illustrated in FIGS. 2 and 4. That is, an end attachment such as a flanged gate can accommodate either style of pipe end configuration.

The end attachment 14, which for purposes of illustration may be a gate or valve for irrigation purposes, typically comprises a body portion having at least one annular or encircling flange 18 which has been provided with means for securing same to the pipe. In addition, the opening 20 through said end attachment may be smaller than the I.D. of said pipe so as to provide an abutting shoulder 22 against which the pipe end rests. For convenience, where needed, in assuring a leak resistant joint between the end attachment 14 and the pipe 10, a sealant 23 may be added between the pipe end and shoulder 22, or between the outer surface of the pipe and the I.D. of the encircling flange 18. This latter feature is not novel per se, but does form a part of the combination disclosed herein. For convenience, each method is shown in FIGS. 1 or 2.

After the end attachment 14 and the pipe 10 are brought into relative engagement in the general manner of FIG. 1, the clamping assembly is placed in a pre-set position to secure same. The pre-set position and the final clamping action will be discussed in more detail hereinafter.

The preferred clamping assembly is made up of a plurality of clamping members 32 disposed about the outside of the pipe at selected intervals along the encircling member, i.e., rod or cable, to be described later. Each of said members comprises an arm 34 pivotal within a plane substantially parallel to the axis of said pipe. The several members are joined to one another by means of a continuous rod 36 or cable encircling the pipe 10 for seating in the corrugation 12a. The rod 36 also functions as the pivot point for the arm 34.

Figure 3:
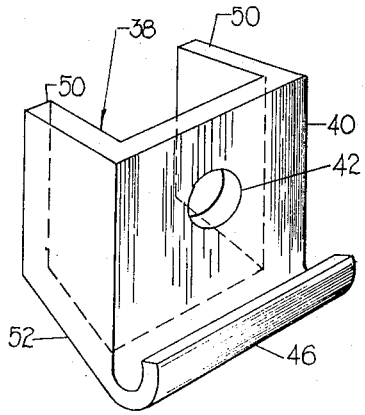
FIG. 3 is a perspective view of a clamping member bracket, but showing hidden features, to help illustrate the means by which the clamping members are joined to the pipe.

To connect arm 34 to the rod 36, a bracket 38 is provided, see FIG. 3. The bracket consists of a first portion 40, which when in the operative position lies substantially perpendicular to the axis of the pipe 10. Said first portion 40 is provided with an opening 42 through which arm 34 passes to be secured by fastening means 44. The lower end of portion 40 is characterized by an up turned end 46 adapted to be seated in corrugation 12a, and to receive and/or encircle rod 36. It will be observed that by this position of the rod 36, in relation to the bracket 38, it is off-set from the center of the bracket 38. This assists in permitting the several clamping members to be effectively tightened and to insure substantially uniform pressure against the pipe end by the end attachment 14. That is, the normal or pre-set position of the bracket 38 is shown in phantom lines 38' in FIG. 1, i.e., high on the inclined surface of the corrugation. As the cable or rod is tightened or contracted about the underlying corrugation, the bracket is caused to move down the inclined surface 48 toward the lowermost portion of the corrugation. By this latter action, the clamping members individually and in concert exert pressure on the end attachment 14 to bring same into a substantially leak resistant engagement with said pipe.

Returning to a further consideration of the clamping assembly and its several members, it will be observed that in a direction opposite from said upturned end 46, the portion 40 is provided with one or more backing members 50, whose lower edge 52 is angled so as to lie substantially contiguous with the inclined side 48 of corrugation 12a. This latter contact facilitates the holding action of the clamping member 32 and the movement described above. In other words, by providing a bracket such as shown in FIG. 3, there is less likelihood that the clamping member 32 in the final position will ride up the surface 48 of the corrugation, thereby breaking the desired seal or connection between the pipe 10 and the end attachment 14.

The clamping members illustrated in the several FIGURES have been shown with an arm restraining member or "relatively thin SPEED NUT 54 threaded onto arm 34". This is optional and may be employed as a simple means to preset the relative position of the arm's engaging head to the bracket, or the distance between the end attachment 14 and the bracket 38. By utilizing this simple expedient, one can insure that in the pre-set condition, the bracket will occupy a position coinciding with the phantom lines 38' of the several FIGURES. This assures that upon final tightening, each bracket will be caused to move in the manner indicated such that supplemental pressure will be applied to each.

The preceding discussion thus far covers the two embodiments illustrated in FIGS. 1 and 2. The distinctions therebetween lie in the shape and/or engaging mechanism of the arm 34, and in the end configuration of the pipe, a feature discussed above. However, with respect to the former, FIG. 1 shows the arm 34 as characterized by being L-shaped, with the end 55 received in opening 56 of flange 18. The holding pressure achieved by tightening means 44 in conjunction with the adjustable feature of the tightened cable or rod, will normally suffice to hold end attachment 14 firm against the pipe 10. However, the tip 58 of end 55 may be shaped to lock the arm 34 in opening 56.

A second way to effect the joining together of pipe 10 with end attachment 14 is illustrated in FIG. 2. Here, the arm 34 consists of a headed bolt which engages flange 18a by means of opening 56a. Again, the tightening of means 44 at the opposite end of arm 34, along with contracting the cable or rod 36, will normally provide a sufficient holding action to give a tight and leak resistant joint between the pipe 10 and end attachment 14. It should be apparent that in the latter embodiment, the arm 34 may comprise a double threaded member or non-headed bolt, or that the head may be adjacent to the face of bracket portion 40.

A third and final embodiment of this invention is illustrated in FIG. 4. Here, the end attachment comprises a second pipe 10a of substantially the same diameter as the first. The clamping action is effected in the same way except that the clamping members comprise a pair of brackets 38, 38a, each joined to a separate cable or rod in the manner described, and a single arm 34a engaging the two brackets. As with the design of the arm in FIG. 2, the arm may comprise a double threaded member, such as illustrated, or a threaded member with a head or hook at one end thereof.

This third embodiment has the same adjustable features of the previous embodiments, except that there are in effect two pre-set positions, one for each bracket, before the final position is reached. The phantom lines represent the pre-set positions for the brackets, hence, clamping members.

Since, as above, modifications are contemplated, particularly as they are expected by a skilled artisan after reading these specifications, no limitation is intended to be imposed herein except as set forth in the appended claims.

The embodiments of the invention in which an exclusive property or privilege is claimed are defined as follows:

1. In combination with a pipe having at least one annular corrugation thereabout and an end attachment to be joined thereto, a joint coupling assembly adapted to provide a substantially uniform pressure between said pipe and said attachment and comprising a plurality of clamping members each having an arm pivotal about one end thereof in a plane substantially parallel to the axis of said pipe, means for securing said arm to said pipe and restricting its movement to within said plane, said means including a plurality of brackets adapted to seat in said corrugation, and an annular member seated in said brackets and capable of being constricted inwardly about said brackets, wherein said brackets are disposed between said pipe and said annular member, said brackets being held within said corrugation by said annular member and restricted to a sliding movement thereby in relation to said corrugation, and means at the opposite end of said arms for engagement with and to securely hold said end attachment against said pipe.

2. The combination of claim 1, wherein one side of each said bracket is attached to said annular member and the opposite side lies contiguous with at least a portion of the angled surface of the underlying corrugation.

3. The combination of claim 2, wherein said one side of each said bracket is provided with an upturned channel to receive said annular member.

4. The combination of claim 1, wherein said end attachment comprises a closure for said pipe, said closure being provided with an annular flange to be engaged by said opposite ends of the pivotal arms.

5. The combination of claim 4, wherein each said pivotal arm is substantially L-shaped, and that said engagement is achieved by inserting one leg of each said arm into openings in said flange.

6. The combination of claim 1, wherein each said arm is a member threaded on at least one end thereof and adapted to be secured to said end attachment.

7. The combination of claim 6, wherein each said threaded member is provided with an integral head at one end thereof.

8. The combination of claim 1, including means to predetermine the distance from said opposite end of each said arm to its corresponding bracket.

9. In combination with two pipes having similar diameters and placed in end-to-end relationship, wherein each said pipe is provided with at least one annular corrugation near said ends, a coupling assembly adapted to provide a substantially uniform pressure between said pipes and comprising a plurality of clamping members uniformly spaced about the outside of said pipes, each said clamping member being secured to said pipes by a pair of opposed annular members, said clamping member comprising a pair of brackets, where one bracket of each said pair is adapted to seat in a corrugation in a different one of said pipes, and each said annular member is seated in one bracket of each said pair thereof, wherein said brackets are disposed between one of said pipes and its corresponding annular member and held within said corrugation by its annular member and restricted to a sliding movement thereby in relation to said corrugation, and an elongated member engaging each said pair of brackets whereby to secure said pipes in end-to-end relationship.

10. The combination of claim 9, wherein one side of each said bracket is attached to its annular member and the opposite side lies contiguous with at least a portion of the angled surface of the underlying corrugation.

11. The combination of claim 10, wherein said one side of each said bracket is provided with an upturned channel to receive its annular member.

12. The combination of claim 9, wherein each said elongated member is a threaded rod having at least one member threadably engaged therewith.

13. The combination of claim 12, including means on said rod to predetermine the distance between said pair of brackets.

* * * * *